June 13, 1972    V. M. KRAMER    3,669,586
APPARATUS FOR MAKING FLEXIBLE TUBING WITH ANNULAR CORRUGATIONS
Filed June 17, 1970    2 Sheets-Sheet 1
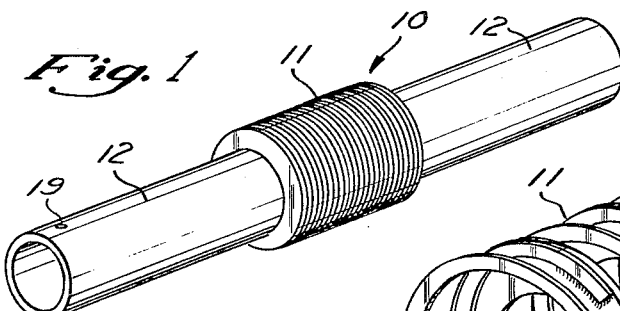
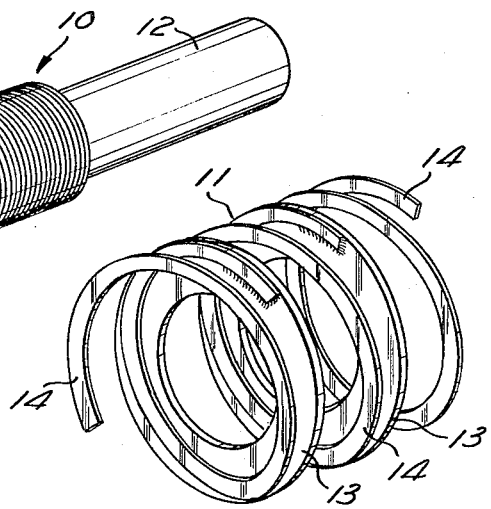
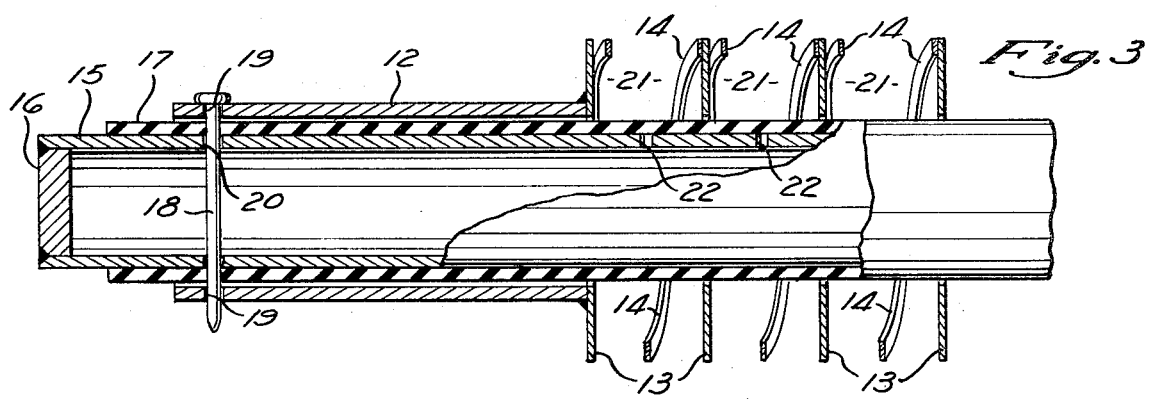
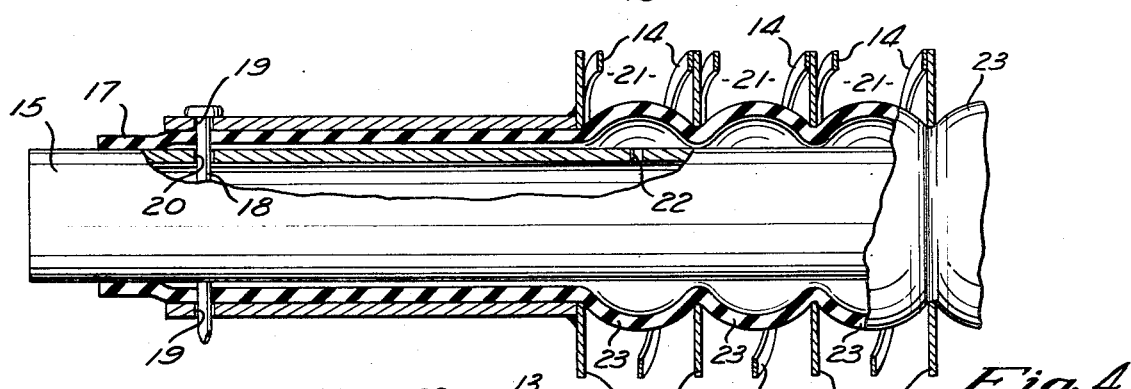
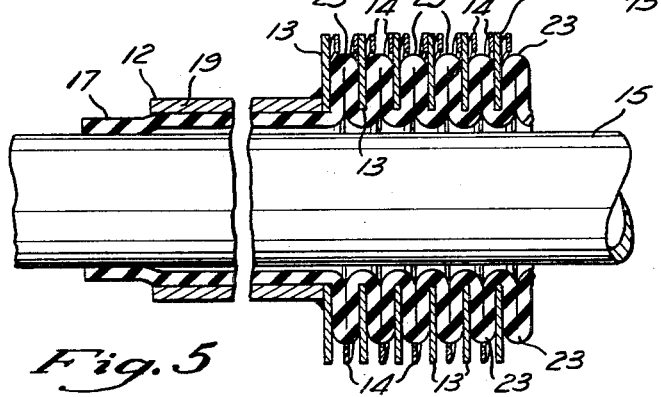
INVENTOR.
VANCE M. KRAMER
BY
BOSWORTH, SESSIONS
HERRSTROM & CAIN
ATTORNEYS

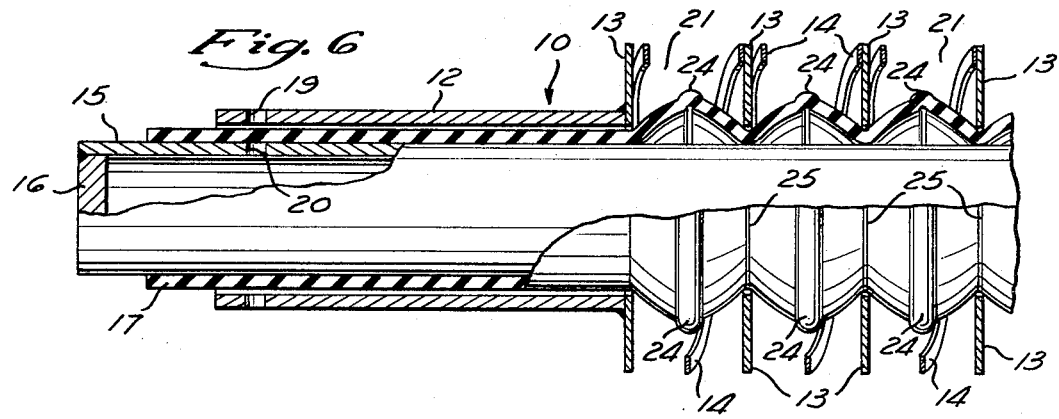
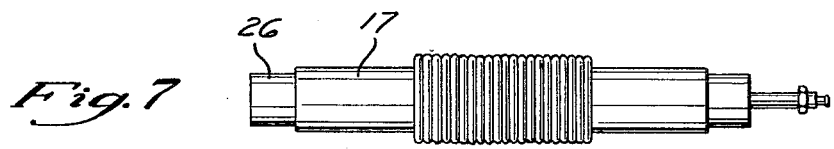
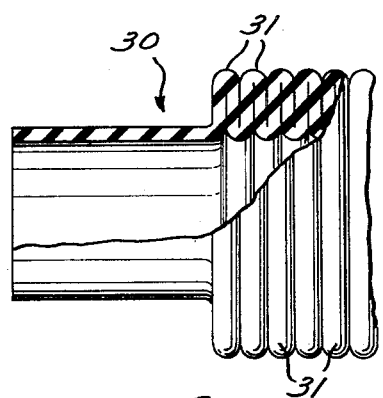
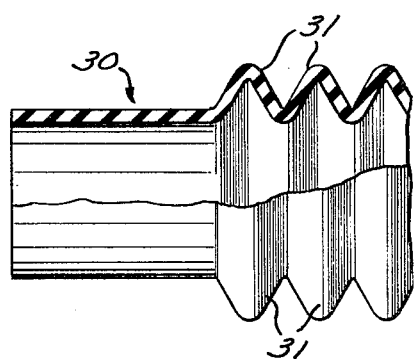

United States Patent Office 3,669,586
Patented June 13, 1972

3,669,586
APPARATUS FOR MAKING FLEXIBLE TUBING WITH ANNULAR CORRUGATIONS
Vance M. Kramer, Perrysburg, Ohio
(% Crushproof Tubing Co., McComb, Ohio 45858)
Filed June 17, 1970, Ser. No. 46,865
Int. Cl. B29c 17/00
U.S. Cl. 425—109      4 Claims

ABSTRACT OF THE DISCLOSURE

Method and apparatus for making rubber tubing with annular corrugations and uniform wall thickness. The apparatus includes a tubular cylindrical mandrel adapted to receive a sleeve of extruded rubber, and an axially extensible external form adapted to be received over the mandrel and sleeve. The form includes a plurality of axially spaced parallel dics each having a circular opening coaxial with the respective circular openings of the other discs, and a plurality of resilient extensible spring segments, each of which connects together two adjacent discs in a manner to permit extension of the segment to increase the axial spacing between the respective two discs. The mandrel has radial ports so that the sleeve may be expanded by internal pressure to make a preliminary impression in the uncured rubber caused by the edges of the circular openings of the discs.

BACKGROUND OF THE INVENTION

This invention relates to the manufacture of flexible rubber tubing with annular corrugations and a uniform wall thickness. More particularly the invention relates to a method and apparatus for the manufacture of such tubing using certain improvements upon the method and apparatus disclosed in U.S. Pats. Nos. 3,168,604 and 3,304,-581, and especially to an apparatus for making flexible rubber tubing using an improvement on the "axially extensible heliv" method of Pat. No. 3,168,604 so as to produce tubing with annular rather than helical corrugations.

As disclosed in U.S. Pats. Nos. 3,168,604 and 3,304,581, helically corrugated tubing may be made by sliding an extruded sleeve of uncured rubber over a cylindrical forming mandrel, telescoping a helical forming spring over the sleeve, stretching the spring axially so that helical spaces are defined between adjacent convolutions of the spring, and then inflating the sleeve by fluid pressure in the mandrel to expand the wall of the sleeve into the helical spaces. With the sleeve thus inflated the spring is collapsed axially with the walls of the sleeve still within the constricting spaces so that the sleeve is axially shortened as the side wall thereof is squeezed in accordion fashion between the helices of the spring. This results in the impressing of a helical crease in the uncured rubber.

The creased sleeve is then removed and placed on a curing mandrel where it is again shortened axially into a helically corrugated form with adjacent convolutions collapsed closely beside one another. The rubber thus formed is then cured in a curing oven. The resulting product is quite flexible and is axially stretchable to two or three times its normal collapsed length. It also has a uniform wall thickness.

The helically corrugated tube produced has particular application as tubing for use in connection with vacuum cleaning equipment, etc.

In certain commercial applications for such tubing however, such as where air is passed through the tubing at high velocity (as with vacuum cleaner hose), a screaming sound is produced due to the helical corrugations. Also in the case of vacuum cleaner hose, when the hose is stretched out while using an implement such as a vacuum cleaner head at the free end, a twisting or turning of the tool occurs. Where the helically corrugated hose is clamped to associated equipment with clamps designed for use with annularly corrugated hose, this twisting may cause the hose to pull loose from the clamp.

Since the axially extensible helix method of making flexible corrugated rubber tubing has heretofore been limited to the production of helically corrugated tubing, it has had certain disadvantages in some specific applications. The present invention however improves upon the axially extensible helix method so as to accomplish the manufacture of annularly corrugated rubber tubing that does not present the difficulties indicated above and yet the method and apparatus of the invention retain the advantages afforded by the axially expansible helix method and apparatus. The invention also affords other features and advantages heretofore not obtainable.

SUMMARY OF THE INVENTION

It is among the objects of the invention to provide a method and apparatus for making flexible rubber tubing with annular corrugations while achieving the advantages of the axially extensible helix method.

Another object is to provide an apparatus adapted for rapid, economical and large scale commercial production of annularly corrugated rubber tubes of uniform wall thickness.

These and other objects are accomplished by means of an apparatus including a cylindrical mandrel adapted to receive a sleeve of extruded rubber and an axially extensible external form adapted to be received over the mandrel and sleeve. The form includes a plurality of axially spaced parallel discs each having a circular opening coaxial with the respective circular opening of the other discs, and a plurality of resilient extensible spring segments, each of which connects together two adjacent discs in a manner to permit extension of the segment to increase the annular space between the respective two adjacent discs. Thus when the external form is in its stretched or axially elongated condition the spacing between adjacent discs is increased so that the sleeve may be expanded into the annular space between adjacent discs by internal fluid pressure to cause preliminary annular impressions in the uncured rubber.

According to the preferred form the ends of each spring segment are located at diametrically opposed portions relative to the axis of the respective segments so as to reduce any tendency of the discs to tilt relative to the axis of the form when the helices are expanded or stretched.

BRIEF DESCRIPTION OF THE DRAWINGS

FIG. 1 is a perspective view showing an external form embodying the invention for use with associated equipment in making flexible rubber tubing with annular corrugations;

FIG. 2 is a fragmentary perspective view on an enlarged scale showing the discs and helical spring segments of the form of FIG. 1;

FIG. 3 is a side elevation of the apparatus of the present invention with an uncured rubber sleeve secured between the external form and the mandrel to illustrate a preliminary step of the method of the invention, with parts broken away and shown in section for the purpose of illustration;

FIG. 4 is a side elevation similar to FIG. 3 but illustrating a later sequential step of the method of the invention;

FIG. 5 is a side elevation similar to FIGS. 3 and 4 and illustrating a still further sequential step of the method of the invention;

FIG. 6 is a side elevation similar to FIGS. 3, 4 and 5 showing still another sequential step in the method of the invention;

FIG. 7 is a side elevation on a somewhat smaller scale showing a sleeve of uncured rubber that has been impressed with annular creases by the apparatus of the invention, the sleeve being mounted on a curing mandrel and axially compressed for curing in an annularly corrugated state;

FIG. 8 is a fragmentary elevational view on an enlarged scale showing a length of annularly corrugated rubber tubing manufactured with the apparatus of the invention; and FIG. 9 is a fragmentary elevational view similar to FIG. 8 showing the length of tubing of FIG. 8 stretched axially to about twice its length when in its relaxed condition.

DESCRIPTION OF THE PREFERRED EMBODIMENT

Referring more particularly to the drawings, FIGS. 1 and 2 show an external forming member 10 designed for use in the forming of an extruded sleeve of uncured rubber into a tubular length having the intermediate portions thereof formed with annular corrugations. The forming member 10 has an axially expansible portion 11 and two tubular end portions 12.

Referring to FIG. 2 the expansible portion 11 comprises a plurality of annular discs 13 connected together by helical spring segments 14. In this instance the connecting is accomplished by welding the respective ends of the helical spring segments 14 to the side of one of the discs 13 preferably at circumferential locations diametrically opposite relative to the axis of the form 10. The helical segments 14 have approximately the same outer diameter as the discs 13 but have a substantially larger inner diameter than the diameter of the central openings of the annular discs.

Each of the spring segments 14 is formed of resilient metal such as steel and each is essentially a thin metal bar of rectangular cross section, formed into helical convolutions having a naturally collapsed condition as indicated in FIG. 1 but which may be axially extended to several times their collapsed length as indicated in FIG. 2. When the expansible portion 10 is axially stretched the elongation or stretching of the segments 14 produces uniform spacing between each adjacent disc 13 and the discs remain in parallel planes perpendicular to the axis of the form due to the manner of attachment to the helical segments.

FIGS. 3 through 8 illustrate sequentially the use of the forming member 10 and the practice of the method of the invention as well as the resulting product. Referring to FIG. 3, the forming member 10 is used in cooperation with a forming mandrel 15 which is also of tubular cylindrical form and which is closed at its outer or left hand end as viewed in FIG. 2 by a plug 16 which is welded in position. In use, an extruded sleeve 17 of uncured rubber is slid over the mandrel 15 in the initial part of the operation. The forming member 10 is then telescoped over the sleeve 17 and mandrel 15 after which the ends 12 of the forming member 10 are pulled apart to stretch the helical spring segments 14.

The forming member 10 is held in this axially elongated position (FIG. 3) by means of pins 18 at its opposite ends which extend through radial holes 19 in the wall of the member 10, through the sleeve 17, which is easily punctured, and then through radial holes 20 in the forming mandrel 13. As illustrated in FIG. 3 the extension or stretching of the forming member 10 results in the helical spring segments 14 being axially elongated and thus enlarged annular spaces 21 are defined between adjacent discs 13.

FIG. 4 illustrates the next step in the operation of the apparatus and the practice of the method, wherein fluid under pressure, such as air, is introduced into the mandrel 15 at the end thereof opposite the end with the plug 16, and flows through radial holes 22 to the space between the sleeve 17 and the outer surface of the mandrel 15. The fluid pressure inflates the sleeve 17 and helical bulges 23 are formed in the spaces 21 between the discs 13.

With the sleeve 17 in this condition, the forming member 10 is axially compressed as illustrated in FIG. 5 so that the helical bulges 23 are squeezed between adjacent discs 13 resulting in annular physical impressions in the uncured rubber sleeve 15. These impressions as indicated in FIG. 6 take the form of annular ridges 24 at the peaks of the bulges and annular creases 25 where the inner edges of the annular discs have engaged the inflated rubber.

After this step is accomplished the forming member 10 is again stretched out as is the sleeve 17 (FIG. 6). The forming member 10 is removed from the sleeve by pulling at one end. This causes the spring segments 14 to stretch and the respective portion of the sleeve 17 to further extend. The extension of the sleeve 17 is sufficient to reduce the diameter of the bulges 23 between the discs 13 and permit the forming member 10 to be removed from the sleeve 17 and mandrel 15.

The impressed sleeve 17 is then removed from the forming mandrel 15 and placed on a curing mandrel 26 (FIG. 7) where the length of the portion of the sleeve formed with the annular crests 24 and annular creases 25 is reduced to produce annular corrugations that may be closely spaced as shown or of wider spacing as desired.

The resulting product is best illustrated in FIG. 8 wherein it will be seen that the cured rubber tube 30 is provided with annular corrugations 31. The tube 30 has a uniform wall thickness throughout its length, is relatively flexible and can be stretched or axially elongated to well beyond its natural or collapsed length.

While the invention has been shown and described with respect to a specific embodiment thereof this is intended for the purpose of illustration rather than limitation and other variations and modifications will be apparent to those skilled in the art upon a reading of the specification and claims. Accordingly the patent is not to be limited in any way that is inconsistent with the extent to which the progress in the art has been advanced by the invention.

I claim:

1. Apparatus for making rubber tubing having annular corrugations, comprising a cylindrical mandrel adapted to support an extruded sleeve of uncured rubber thereon, and an axially extensible external form adapted to be disposed over said mandrel and sleeve, said form comprising a plurality of axially spaced parallel annular discs each having a circular opening providing an internal circular edge coaxial with the respective internal circular edges of the other discs, and a plurality of resilient spring segments, each segment at least partially encircling the mandrel and being connected to and connecting together two adjacent discs, said internal edges of said discs defining a cylindrical surface having a diameter slightly greater than the diameter of a sleeve disposed on said mandrel and said spring segments providing the sole connection between adjacent discs and permitting the annular spaces between adjacent discs and the length of the form to be increased and decreased, and means for supplying air under pressure to the interior of said sleeve for radially expanding said sleeve to cause annular portions thereof to bulge into said annular spaces and form preliminary annular impressions in the uncured rubber by engagement of the sleeve with the circular edges of the discs, the sleeve being removable from the form only by relative movement between the sleeve and the form in an axial direction.

2. Apparatus as defined in claim 1 wherein said spring segments are axially extensible helical springs coaxial with and of larger inner diameter than the diameter of the openings of said discs.

3. Apparatus as defined in claim 1 wherein the ends of each spring segment are connected to the respective two adjacent discs at diametrically opposite locations relative to the axis of said external form.

4. Apparatus as defined in claim 1 wherein each of said spring segments comprises about one and one half convolutions.

References Cited

UNITED STATES PATENTS

| | | | |
|---|---|---|---|
| 3,371,381 | 3/1968 | Louth | 18—19 TC |
| 2,813,573 | 11/1957 | Roberts | 18—19 TC X |
| 3,076,228 | 2/1963 | Johnson | 18—19 TC |

FOREIGN PATENTS

| | | | |
|---|---|---|---|
| 652,810 | 5/1951 | Great Britain | 264—94 |
| 1,044,283 | 9/1966 | Great Britain | 18—19 TC |

J. SPENCER OVERHOLSER, Primary Examiner

M. O. SUTTON, Assistant Examiner

U.S. Cl. X.R.

425—387